(12) United States Patent
Jao et al.

(10) Patent No.: US 7,499,544 B2
(45) Date of Patent: Mar. 3, 2009

(54) USE OF ISOGENIES FOR DESIGN OF CRYPTOSYSTEMS

(75) Inventors: David Y. Jao, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 959 days.

(21) Appl. No.: 10/816,083

(22) Filed: Mar. 31, 2004

(65) Prior Publication Data

US 2005/0094806 A1    May 5, 2005

Related U.S. Application Data

(60) Provisional application No. 60/517,142, filed on Nov. 3, 2003.

(51) Int. Cl.
*H04L 9/30* (2006.01)
(52) U.S. Cl. ........................................... 380/30
(58) Field of Classification Search .................. None
See application file for complete search history.

(56) References Cited

U.S. PATENT DOCUMENTS

| 5,497,423 | A | 3/1996 | Miyaji | |
|---|---|---|---|---|
| 6,212,277 | B1 | 4/2001 | Miyaji | |
| 7,113,594 | B2* | 9/2006 | Boneh et al. | 380/28 |
| 2003/0081771 | A1* | 5/2003 | Futa et al. | 380/30 |

| 2003/0123655 | A1 | 7/2003 | Lambert et al. |
|---|---|---|---|

FOREIGN PATENT DOCUMENTS

| EP | 1 215 642 A1 | 6/2002 |
|---|---|---|
| EP | 1306749 A2 | 5/2003 |
| WO | WO 99/30458 | 6/1999 |
| WO | WO 00/14924 | 3/2000 |

OTHER PUBLICATIONS

Eisentrager, Kirsten et al. Improved Weil and Tate Pairings for Elliptic and Hyperelliptic Curves. Nov. 21, 2003. arXiv:math/0311391v2. http://arxiv.org/abs/math.NT/0311391.*
Rubin K et al, "Supersingular abelian varieties in cryptology", Advances in Cryptology—Annual International Cryptology Conference, Proceedings, Springer-Verlag, XX, vol. 2442, 2002, pp. 336-353, XP002268384, Germany.
Anonymous (author unknown), "Cryptographic Systems Based on Isogenies", 17 pages, Nov. 3, 2003.

(Continued)

*Primary Examiner*—Gilberto Barron, Jr.
*Assistant Examiner*—Martin Jeriko P San Juan
(74) *Attorney, Agent, or Firm*—Lee & Hayes, PLLC (57) ABSTRACT

Techniques are disclosed to provide public-key encryption systems. More particularly, isogenies of Abelian varieties (e.g., elliptic curves in one-dimensional cases) are utilized to provide public-key encryption systems. For example, the isogenies permit the use of multiple curves instead of a single curve to provide more secure encryption. The techniques may be applied to digital signatures and/or identity based encryption (IBE) solutions. Furthermore, the isogenies may be used in other applications such as blind signatures, hierarchical systems, and the like. Additionally, solutions are disclosed for generating the isogenies.

27 Claims, 5 Drawing Sheets

OTHER PUBLICATIONS

Anonymous (author unknown), "Cryptographic Systems Based on Isogenies", Nov. 3, 2003, pp. 1-13.

Anonymous (author unknown), "On Using Isogenies in Elliptic Curve Cryptosystems", Feb. 10, 2004, pp. 1-14.

Jao, D., Venkatesan, R., "Short signatures based on isogenies", Jan. 14, 2004, pp. 1-4.

Jao, D., Venkatesan, R., "Short signatures based on isogenies", Feb. 20, 2004, pp. 1-3.

Jao, D., Venkatesan, R., "Cryptographic systems based on Isogenies", Oct. 31, 2003, pp. 1-8.

Jao, D., Venkatesan, R., "Cryptographic Systems Based on Isogenies", Feb. 17, 2004, pp. 1-14.

Galbraith, S. D., Hess, F., Smart, N. P.; "Extending the GHS Weil Descent Attack" Eurocrypt 2002, pp. 29-44.

Barreto, P. S. L. M; "The Pairing-Based Crypto Lounge" Published on the internet at http://planeta.terra.com.br/informatica/paublobarret/pblounge.html Sep. 13, 2002, last updated Mar. 28, 2004, 22 pgs.

Boneh, D., Gentry, C.; "Aggregate and Verifiably Encrypted Signatures from Bilinear Maps" Proceedings of Eurocrypt 2003, 22 pgs.

Boneh, D., Siverberg, A.; "Applications of Multilinear Forms to Cryptography" Published to the Internet at http://eprint.iacr.org 2002, 20 pages.

Boneh, D., Venkatesan, R.; "Breaking RSA May be Easier Than Factoring" Proceedings of Eurocrypt 1998, 12 pages.

Boneh, D., Franklin, M.; "Identity-Based Encryption from the Weil Pairing" SIAM Journal of Computing 32, pp. 586-615.

Boneh, D., Lynn, B., Shacham, H.; "Short Signatures from the Weil Pairing" Proceedings of Asiacrypt 2001, 19 pgs.

Coron, J.-S.; "On the exact Seccurity of Full Domain Hash" Advances in Cryptology—Crypto 2000, 7 pages.

Fujisaki, E., Okamato, T.; "Secure Integration of Asymmetric and Symmetric Encryption Schemes" Proceedings of Crypto 1999, pp. 537-554.

Galbraith, S. D., "Constructing Isogenies Between Elliptic Surves Over Finite Fields" Journal of Computaional Mathematics vol. 2, 1999 pp. 118-138.

Horwitz, J., Vankatesan, R.; "Random Cayley Digraphs and the Discrete Logarithm" Algorithmic Number Theory Symposium, 2002, 15 pgs.

Joux, A., Nguyen, K.; "Separating Decision Diffie-Hellman from Diffie-Hellman in Cryptographic Groups" published on the internet at http://eprint.iacr.org, at least as early as Mar. 2004, 7 pages.

Kohel, D.R., Shparlinski, I. E.; "On Exponential Sums and Group Generators for Elliptic Curves over Finite Fields" Lecture Notes in Computer Science, 2000, pp. 395-404.

Lercier, R., Morain, F.; "Algorithms for Computing Isogenies Between Elliptic Curves" Computational Perspectives on Number Theory: Proceedings of a Conference in Honor of AOL Atkin, 1998, 14 pgs.

Martin, G.; "An Asymptotic Formula for the number of Smooth Values of a Polynomial" Journal of Number Theory, 2002, pp. 108-182.

Miller, V.; "use of Elliptic Curves in Cryptography" Advances in Cryptology Crypto 1985, pp. 417-426.

Okamoto, T., Pointcheval, D.; "The Gap-Problems: a New Class of Problems for the Security of Cryptorgraphic Schemes" Proceedings of the 2001 International Workshop on Practice and Theory in Public Key Cryptography, Feb. 2001, 15 pgs.

Shoup, V.; "Lower Bounds for Discrete Logarithms and Related Problems" Revision of Paper in Proceedings in Eurocrypt 1997, 12 pages.

Silverman, J. H.; The Arithmetic of Elliptic Curves, Spinger-Verlag, 1986 pp. 17-40, "A Survey of the Arithmetic Theory of Elliptic Curves".

Maurer, U., Wolf, S.; "Lower Bounds on Generic Algorithms in Groups" Eurocrypt 1998, 14pgs.

T. Beth and F. Schaefer, "Non Supersingular Elliptic Curves for Public Key Cryptosystems," Advances in Cryptology-Eurocrypt '91, Lecture Notes in Computer Science, 547 (1991), Springer-Verlag, pp. 316-327.

* cited by examiner

USE OF ISOGENIES FOR DESIGN OF CRYPTOSYSTEMS

RELATED APPLICATION

The present application claims priority from the U.S. provisional patent application No. 60/517,142, filed Nov. 3, 2003, entitled "Use of Isogenies for Design of Cryptosystems," the disclosure of which is incorporated herein by reference.

TECHNICAL FIELD

The present invention generally relates to cryptology, and more particularly, to utilization of isogenies for design of cryptosystems.

BACKGROUND

As digital communication becomes more commonplace, the need for securing the associated communication channels becomes increasingly more important. For example, current technologies allow a user to remotely access bank accounts, medical data, and other private and sensitive information.

Cryptology has been widely used to provide secure digital communication. Cryptology generally relates to the enciphering (or encrypting) and deciphering (decrypting) of messages. The encryption and decryption uses some secret information (such as a key). In different encryption methods, a single key or multiple keys may be used for encryption and decryption.

One commonly used multiple key cryptosystem is a public-key encryption system. In a public-key system, a sender wishing to send an encrypted message to a recipient obtains an authenticated public key for the recipient that is generated using a private key. As the name implies, the public key can be available from public sources. Moreover, to avoid an impersonation attack, the public key is often authenticated. The public-key authentication may be made by a technique such as exchanging keys over a trusted channel, using a trusted public file, using an on-line trusted server, or using an off-line server and certificates.

After obtaining the authenticated public key, the sender encrypts an original message with the public key and generates a ciphertext. The intended recipient then utilizes the private key to decrypt the ciphertext to extract the original message. Decrypting the ciphertext without access to the private key is believed to be infeasible. Accordingly, only a party that has access to the private key may successfully decrypt the ciphertext.

One significant advantage of public-key systems over symmetric cryptosystems (such as stream or block ciphers) is that in two-party communications, only the private key needs to be kept secret (whereas in symmetric cryptosystems, the key is kept secret at both ends).

A current public-key encryption system utilizes certain elliptic curves (ECs) over a finite field. A pair of published values derived from an elliptic curve is utilized as a public key (including points on the curve and their corresponding public key which is generated by a simple multiplication (i.e., integer multiplication) on the curve). Verification is done using a bilinear pairing on the curve.

Generally, elliptic curves are believed to provide encryption systems with relatively lower communication requirements than traditional systems such as RSA (Rivest, Shamir, and Adleman public key encryption technology), while maintaining similar security levels.

An issue with the current public-key encryption systems is that none has been proven to be secure. As a result, the security of current public-key encryption systems is presumed based on the difficulty of a set of number-theoretic problems.

Accordingly, public-key encryption systems are desired which provide additional security.

SUMMARY

Techniques are disclosed to provide public-key encryption systems. More particularly, isogenies of Abelian varieties (e.g., elliptic curves in one-dimensional cases) are utilized to provide public-key encryption systems. For example, the isogenies permit the use of multiple curves instead of a single curve to provide more secure encryption. The techniques may be applied to digital signatures and/or identity based encryption (IBE) solutions. Furthermore, isogenies may be used in other applications such as blind signatures, hierarchical systems, and the like. Additionally, solutions are disclosed for generating the isogenies.

In one described implementation, a method includes publishing a public key corresponding to an isogeny. The method further includes decrypting an encrypted message using a decryption key which corresponds to the isogeny (e.g., is its dual isogeny).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following discussion assumes that the reader is familiar with cryptography techniques. For a basic introduction of cryptography, the reader is directed to a text written by A. Menezes, P. van Oorschot, and S. Vanstone entitled, "Handbook of Applied Cryptography," fifth printing (August 2001), published by CRC Press.

The following disclosure describes techniques for improving public-key systems that are based on multiple elliptic curves (or Abelian varieties in general). Various techniques are disclosed for generating isogenies (or mappings) between the curves. The generated isogenies permit use of multiple curves instead of single curve to provide public encryption. Furthermore, the techniques may be applied to relatively short digital signatures (e.g., typed in by a user or sent over a low-bandwidth channel) and/or identity based encryption (IBE) solutions (e.g., allowing memorizable public keys).

The short signatures may also provide additional efficiency through aggregate verification.

Overview of Cryptosystems with Isogenies

Figure 1:
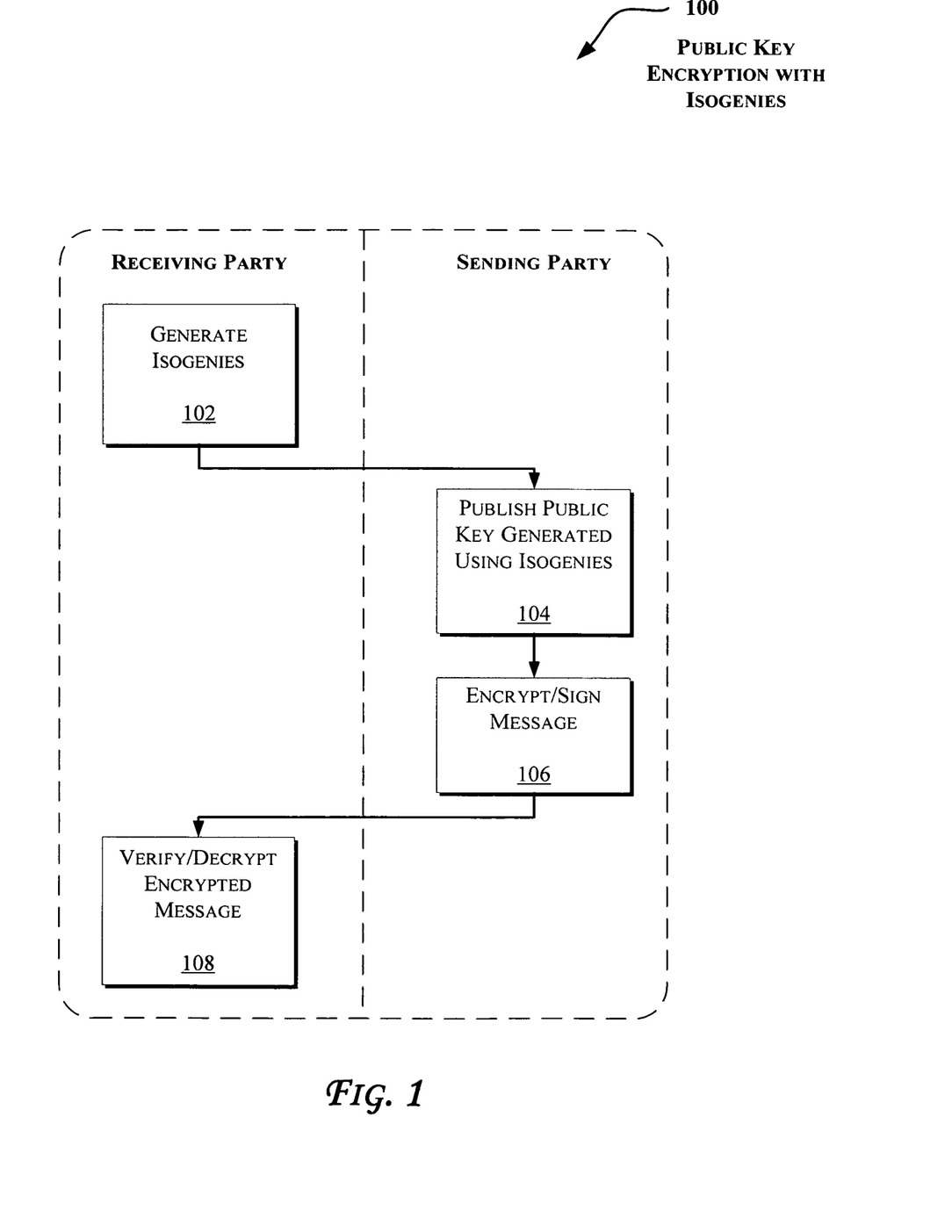
FIG. 1 illustrates an exemplary method for using isogenies in a cryptosystem.

FIG. 1 illustrates an exemplary method 100 for using isogenies in a cryptosystem. A stage 102 generates isogenies (of elliptic curves, or more generally Abelian varieties). The isogenies may be generated by a receiving party or another party (such as a trusted party further discussed with reference to FIG. 5). The stage 102 may also generate the corresponding dual isogeny for each of the generated isogenies (as will be further discussed below). Various methods for generating isogenies are detailed below under the same title. Additionally, as will be further detailed with reference to FIGS. 3 and 5, the generated isogenies are utilized to provide public keys and the public keys are published (104). The public keys may be published by the sending party or a trusted authority (see, e.g., discussion of FIGS. 3 and 5).

A sending party then encrypts (or signs) messages using an encryption key (106). The encrypted messages of the stage 106 may be verified/decrypted by the receiving party using a decryption key to determine the authenticity of the encryption or signing (108). In one implementation, Weil pairing is utilized to verify the encrypted messages (such as discussed below under the same title). However, Weil pairing is but one example of pairing that may be utilized for the verification or decryption. For example, other bilinear and/or non-degenerate pairing techniques may be utilized such as Tate pairing and square pairing.

Overview of Isogenies

Figure 2:
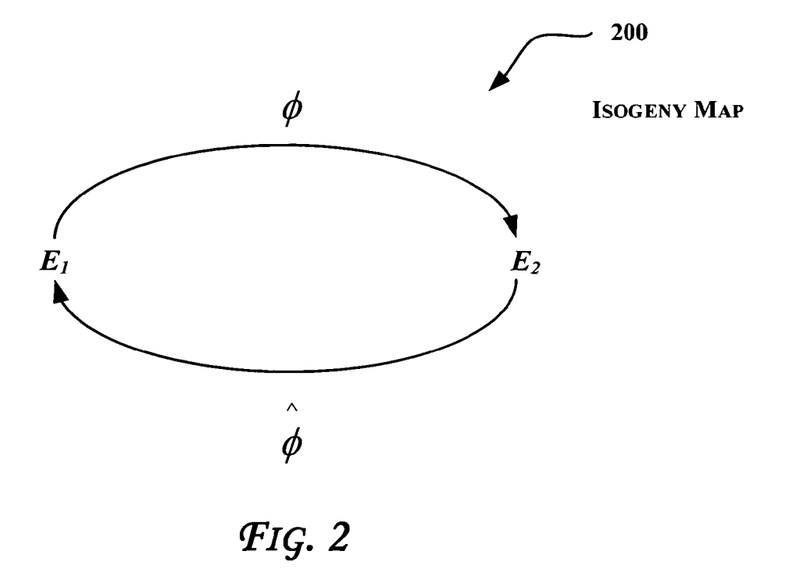
FIG. 2 illustrates an exemplary map of an isogeny between two curves.

FIG. 2 illustrates an exemplary map of an isogeny 200 between two curves (e.g., elliptic curves). As illustrated, a curve $E_1$ may be mapped onto a curve $E_2$ by an isogeny $\phi$ (where $\phi: E_1 \rightarrow E_2$). FIG. 1 also illustrates the dual isogeny $\hat{\phi}$ (where $\hat{\phi}: E_2 \rightarrow E_1$).

In various implementations, using isogenies in cryptosystems is envisioned to provide properties such as: given a curve $E_1$, generating a pair $(\phi, E_2)$ is relatively efficient, where $\phi: E_1 \rightarrow E_2$ is an isogeny, but given a pair $(E_1, E_2)$ of isogenous curves, it is believed to be relatively hard to construct any nonzero isogeny $\phi: E_1 \rightarrow E_2$, much less a specific isogeny. Therefore, if a distinction is drawn between a global break (defined as a computation allowing any subsequent message to be broken in polynomial time) and a per-instance break, then the best known attacks at this time against isogeny based cryptosystems take either substantially more time than discrete log for a global break or else one discrete log computation per message for the "naive" per-instance attack.

For example, considering a token system where each client is given a specific signed message that grants access to some service (which may be of low value), the client may have to read the token over the phone to a representative, and thus the signatures can be relatively short. It will be reasonable to use parameters that are sufficiently large to make a per message attack more costly than the service provided, while keeping a global break prohibitively expensive.

Details of Isogenies

A field k can be fixed with characteristic p with q elements and having an algebraic closure $\bar{k}$. Let E/k be an elliptic curve defined over a field k and E(k) be the group defined over k, and let k(E) denote the function field of the elliptic curve. Also, let $[n]_E$ or $[n]$ denote the map $P \mapsto n \cdot P$ on E and E[n] denote the kernel of this map.

An isogeny $\phi: E_1 \rightarrow E_2$ is a non-constant morphism that sends the identity element of $E_1$ to that of $E_2$. When such an isogeny exists, one may say that $E_1$ and $E_2$ are isogenous. The isogeny is defined over k if $\phi$ has defining equations with coefficients in k. Any isogeny also turns out to be group homomorphism, i.e., $\phi(P+Q)=\phi(P)+\phi(Q)$ for all $P, Q \in E_1$, where the addition on the left hand side is the group law on $E_1$ and the addition on the right hand side is that of E2. Hence the kernel of $\phi$ is a subgroup of $E_1$.

Let $\mathrm{Hom}_k(E_1, E_2)$ denote the set of isogenies from $E_1$ to $E_2$ that are defined over k. $\mathrm{Hom}_{\bar{k}}(E_1, E_2)$ is denoted by $\mathrm{Hom}(E_1, E_2)$. For any isogeny $\phi: E_1 \rightarrow E_2$, there is a dual isogeny $\hat{\phi}: E_2 \rightarrow E_1$ such that:

$$\hat{\phi} \circ \phi = [n]_{E_1} \text{ and } \phi \circ \hat{\phi} = [n]_{E_2},$$

where $n = \deg(\phi)$ is the degree of the isogeny. The dual isogeny satisfies the standard properties:

$$\hat{\hat{\phi}} = \phi, \ \widehat{\phi + \psi} = \hat{\phi} + \hat{\psi}, \ \widehat{\phi \circ \psi} = \hat{\psi} \circ \hat{\phi}, \ [\hat{n}] = [n].$$

In an implementation, the degree of $\phi$ as a finite map can be further defined as: the degree of the extension of $k(E_1)$ over the pullback (by $\phi$) of the field $k(E_2)$ where $\phi$ is defined over k. It may be convenient to think of it in terms of the size of its kernel (assuming the function field extension is separable) or by the equation above. Hence, it is said that the isogeny is B-smooth if its degree is B-smooth (i.e. the prime divisors of $\deg(\phi)$ are less than or equal to B). The set Hom(E,E) of endomorphisms of an elliptic curve E is denoted End(E); this set has the structure of a ring given by defining:

$$(\phi+\psi)(P)=\phi(P)+\psi(P), (\phi \circ \psi)(P)=\phi(\psi(P)).$$

Generally, the group $\mathrm{Hom}(E_1, E_2)$ is a torsion free left End$(E_2)$-module and right End$(E_1)$-module. When $E_1=E_2=E$, the algebraic structure is richer: $\mathrm{Hom}(E_1,E_2)=\mathrm{End}(E)$ is a ring (not just a module) with no zero divisors and has characteristic zero.

In one implementation, this can be thought of as a lattice: Let E be an elliptic curve defined over some field k. Then, End(E) is isomorphic to either Z, an order in a quadratic imaginary field, or a maximal order in quaternion algebra. For any two elliptic curves $E_1, E_2$, the group $\mathrm{Hom}(E_1, E_2)$ is a free Z-module of rank at most 4. When End(E) is larger than Z, one says that E has complex multiplication. The element in End(E) corresponding to the Frobenius endomorphism $(x,y) \mapsto (x^p, y^p)$ is denoted by $\pi$, and it satisfies the characteristic equation $x^2 - \mathrm{tr}(E)x + q = 0$. The conductor of the elliptic curve c is $[\mathrm{End}(E): Z[\pi]]$.

Weil Pairing

The Weil pairing $e_n: E[n] \times E[n] \rightarrow \mu_n$ is a bilinear, non-degenerate map with values in the group of $n^{th}$ roots of unity in k. In one implementation, Weil pairing is utilized to perform the verification/decryption stage 108 of FIG. 1. However, Weil pairing is but one example of pairing that may be utilized for the verification or decryption. For example, other bilinear and/or non-degenerate pairing techniques may be utilized such as Tate pairing and square pairing. The Weil pairing satisfies the following property:

$$e_n(S, \hat{\phi}(T))=e_n(\phi(S),(T), \text{ where } S \in E_1[n], T \in E_2[n]$$

Here, $e_n(S, \hat{\phi}(T))$ is a pairing computation on $E_1$ while $e_n(\phi(S), T)$ is on $E_2$. Note that both curves have n-torsion points, which puts a constraint on their group orders. This does not pose a problem, since by a theorem of Tate, $E_1(k)$ and $E_2(k)$ are isogenous over k if and only if the two groups of points have the same order.

The Weil pairing evaluates the identity for all pairs of inputs which are linearly dependent. Consequently, a mechanism would be beneficial to ensure that the input points are not scalar multiples of each other. One approach is to use a curve $E_2$ defined over a finite field k which is large enough that the full group $E_2[n] \cong (\mathbb{Z}/n\mathbb{Z})^2$ of n-torsion points is defined over k. In this situation, the probability that two random elements of the group $E_2[n]$ are linearly dependent is negligible, on the order of 1/n, so the value of the Weil pairing can be nontrivial with high probability. The equation above ensures that the distribution of pairing values on $E_1$ will match that of $E_2$.

Alternatively, a modified pairing function $\tilde{e}(P,Q)=e_n(\lambda(P),Q)$ may be used where $\lambda$ is any non-scalar endomorphism, so that P and $\lambda(P)$ are linearly independent and $\tilde{e}(P,P) \neq 1$. Such a map $\lambda$ is called a distortion or twist of E.

Generation of Isogenies

In various implementations, a number of methods can be used to construct isogenies of high degree (e.g., of elliptic curves, or more generally Abelian varieties) and their duals such as discussed with reference to the stage 102 of FIG. 1. The short digital signature and IBE cryptosystems discussed herein may follow the convention that pairs of values $(P,\phi(P))$ are published as the public key, while evaluation of the dual $\hat{\phi}$ constitutes the private key.

In one implementation, the constructions can be summarized as: given any E, there is an algorithm for constructing isogenies E→E whose degree n is randomly distributed, and is a prime with probability ~1/log(n); given any curve $E_1$, there is an algorithm for constructing random B-smooth isogenies from $E_1$ to random targets in time $O(B^3)$; and given $E_1,E_2$ and two linearly independent isogenies in $\text{Hom}_k(E_1,E_2)$ that have relatively prime degree, there is an algorithm to construct isogenies of prime degree (see, e.g., the discussion below with respect to independent isogenies).

Complex Multiplication Isogenies

Let $E_1=E_2$ as before and assume that $E_1$ has complex multiplication (CM) by the imaginary quadratic order $O_D$ of discriminant D<0. A probabilistic algorithm may be described for producing such a curve $E_1$ together with an endomorphism $\phi$ of $E_1$ of large prime degree, in expected time polynomial in |D|.

1. Compute the Hilbert class polynomial $H_D(X)$ of discriminant D. Let K denote the splitting field of $H_D(X)$ over Q.

2. Choose any root x of $H_D(X)$ and construct an elliptic curve E over C having j-invariant equal to x. Note that E is defined over the number field K.

3. By construction, the curve E has complex multiplication by $\sqrt{D}$. Using linear algebra on q-expansions, find explicitly the rational function I(X,Y) with coefficients in K corresponding to the isogeny $\sqrt{D} \in \text{End}\,E$.

4. Choose random integers a and b until $a^2-b^2D$ is prime. Then, the isogeny $a+b\sqrt{D}$ will be an endomorphism of E having prime degree.

5. Choose any prime ideal P of K and reduce the coefficients of E and of I modulo P. Let $E_1$ denote the reduction of E and let $\phi$ be the reduction of $a+b\sqrt{D}$.

Stages 1-3 of the algorithm are deterministic and polynomial time in |D|. As for stage 4, the prime number theorem for number fields implies that $a^2-b^2D$ has probability $1/\log(a^2-b^2D)$ of being prime, so for integers a and b of size n one can expect stage 4 to terminate after $\log(Dn^2)$ trials.

The resulting endomorphism $\phi$ is an endomorphism of $E_1$ of prime degree. Both $\phi$ and its dual $\hat{\phi}=a-b\sqrt{D}$ can be evaluated by having knowledge of a and b, using only the rational function I(X,Y) along with scalar multiplication and addition. Such an isogeny $\phi$ may be called a CM-isogeny.

Modular Isogenies

For any prime l, the modular curve $X_0(l)$ parameterizes isomorphism classes of isogenies $E_1 \to E_2$ of degree l. More specifically, there exists a polynomial equation $\Phi_l(X,Y)$ for $X_0(l)$ with the property that $E_1$ and $E_2$ are l-isogenous if and only if $\Phi_l(j(E_1),j(E_2))=0$.

Using the polynomial $\Phi_l(X,Y)$, one can compute for any $E_1$ an l-isogenous curve $E_2$ together with an explicit polynomial equation for the degree l isogeny $E_1 \to E_2$. Because the modular polynomial is symmetric in X and Y computation with the j-invariants reversed can be used to find the dual isogeny.

In practice, one may not use the polynomials $\Phi_l(X,Y)$ for actual computations because the coefficients of these polynomials are rather large. Instead, different but equivalent polynomial models may be used for $X_0(l)$ having smaller coefficients. Regardless of the precise model used for the computation, an isogeny derived in this way may be referred to as a modular isogeny.

The currently known algorithms for computing modular isogenies are generally feasible for small values of l. By itself, the use of modular isogenies of small degree does not add much security, because an attacker who knows the curves $E_1$ and $E_2$ could check for each l whether the curves are l-isogenous and recover the l-isogeny in the case that they are. However, one can compose many modular isogenies (e.g., for different choices of l) into one isogeny $\phi$ of large smooth degree $\Pi l$, and use $\phi$ as an isogeny without revealing the intermediate curves. An attacker who has the ability to evaluate $\phi$ on arbitrary points may still deduce the primes l by computing all the l-torsion points of $E_1$ and seeing whether any of them are annihilated by $\phi$. However, under the assumption that the dual isogeny computation problem is hard, the attacker will not be able to evaluate $\hat{\phi}$ on points of his choosing. For good measure, one can also compose the resulting isogeny either with scalar isogenies or with CM isogenies in order to introduce large non-smooth factors into the degree in an implementation.

Linearly Independent Isogenies

In an implementation, the linearly independent isogenies $\phi$ and $\psi$ are given from $E_1$ to $E_2$ of relatively prime degree. As a result, the linear combination $a\phi+b\psi$ has a degree given by the quadratic form $a^2\hat{\phi}\phi+ab(\hat{\phi}\psi+\hat{\psi}\phi)+b^2\hat{\psi}\psi$ in the two variables a and b. Note that the coefficients of this quadratic form are integers, since the outer coefficients are the degrees of $\phi$ and $\psi$ and the middle term is equal to $\deg(\phi+\psi)-\deg(\phi)-\deg(\psi)$. Since the quadratic form is primitive, it attains prime values infinitely often as a and b vary over all pairs $(a,b) \in \mathbb{Z}^2$. In this way, many isogenies $E_1 \to E_2$ of large non-smooth (or even prime) degree may be obtained. The probability that the resulting degree will be non-smooth may also be estimated.

Short Signature Schemes Using Isogenies

In an implementation, the techniques discussed herein may be applied to relatively short signature schemes (e.g., typed in by a user or sent over a low-bandwidth channel). Two signature schemes will be discussed below which are partly based on mathematical properties of isogenies and pairings on elliptic curves.

Galois Invariant Signatures

Let $F_{q^n}/F_q$ be an extension of finite fields of degree n. Take an elliptic curve $E_1$ defined over $F_q$ together with an isogeny $\phi: E_1 \to E_2$ defined over $F_{q^n}$, where $E_2$ is an elliptic curve defined over $F_{q^n}$. In one implementation, the curve $E_2$ is defined over L rather than over a subfield of L, but it is possible to take $E_2$ defined over only a subfield. However, for security reasons, the isogeny $\phi$ may not be defined over any proper subfield of $F_{q^n}$. Moreover, the isogeny $\phi$ may be generated in accordance with various techniques such as those discussed above.

Figure 3:
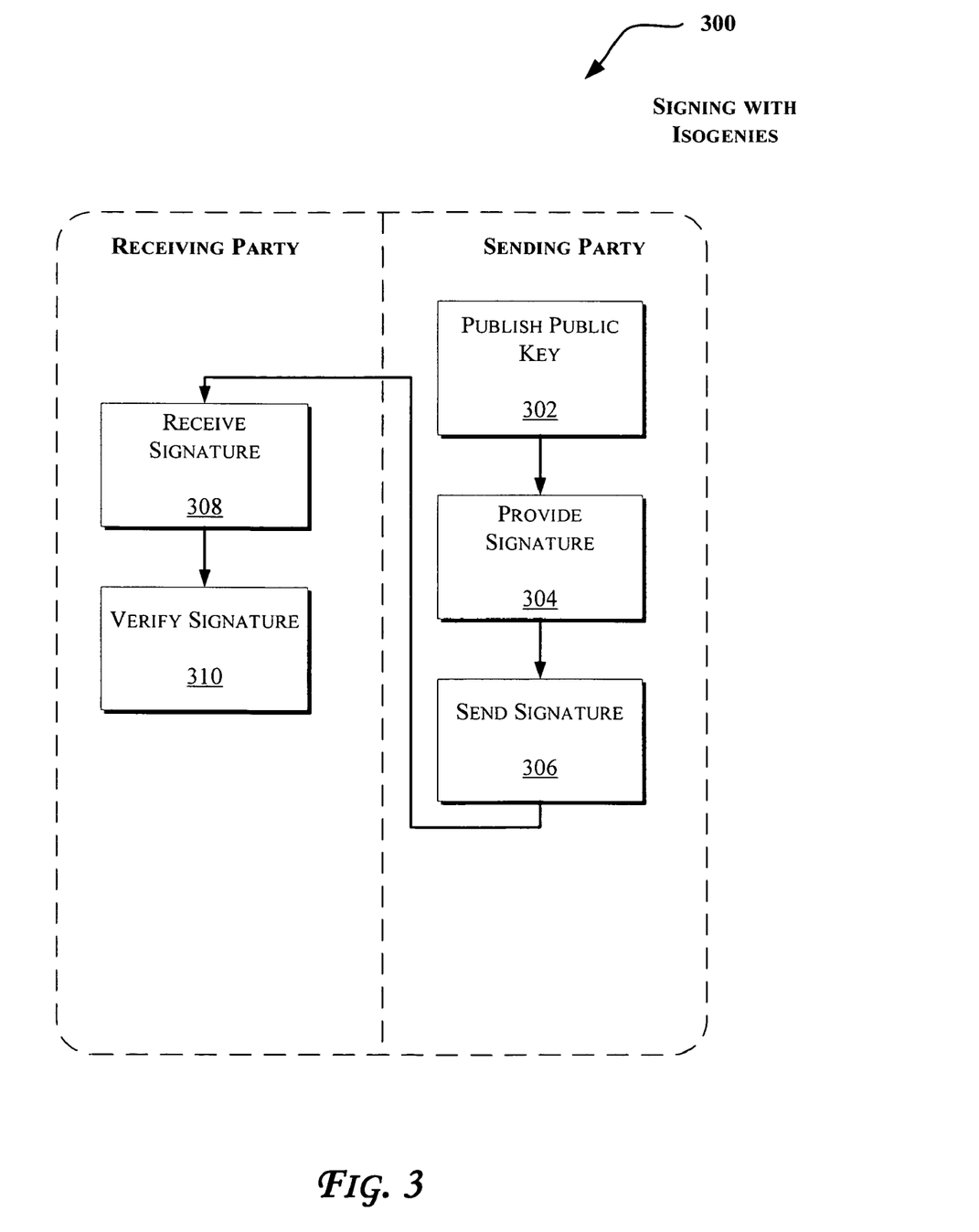
FIG. 3 illustrates an exemplary method for signing a message using isogenies.

FIG. 3 illustrates an exemplary method 300 for signing a message using isogenies. The method 300 includes the following stages:

Public Key. Pick random $P \in E_1(F_q)$ and publish (P,Q) (302), where $Q = \phi(P)$. Note that P is defined over $F_q$ but Q is not defined over $F_q$, because $\phi$ is not.

Secret Key. The dual isogeny $\hat{\phi}$ of $\phi$.

Signature. Let H be a (public) random oracle from the message space to the set of k-torsion points on $E_2$. Given a message m, compute $$S = \sum_{i=0}^{n-1} \pi^i \hat{\phi} H(m)$$

(stage 304, which provides a signature using the secret/private key generated as discussed above), where $\pi$ is the $q^{th}$ power Frobenius map and the sum denotes the elliptic curve sum on $E_1$. For convenience, we denote the operator $$\sum_{i=0}^{n-1} \pi^i$$

by Tr (which stands for "trace"). Output $S \in E_1(F_q)$ as the signature. The signature is then sent to and received by a receiving party (306 and 308, respectively). Note that the Galois group of $F_{q^n}/F_q$ is $\{1, \pi, \ldots, \pi^{n-1}\}$, so S is Galois invariant and thus is defined over $F_q$.

Verification. Let $e_1$ and $e_2$ denote the Weil pairings on $E_1[k]$ and $E_2[k]$, respectively. Given a public key (P,Q) and a message-signature pair (m,S), check whether $$e_1(P, S) = \prod_{i=0}^{n-1} \pi^i e_2(Q, H(m))$$

(stage 310, which verifies the received signature using the public key generated as discussed above). Accordingly, a valid signature satisfies this equation, as follows:

$$e_1(P, S) = e_1\left(P, \sum_{i=0}^{n-1} \pi^i \hat{\phi} H(m)\right) = \prod_{i=0}^{n-1} e_1(P, \pi^i \hat{\phi} H(m))$$
$$= \prod_{i=0}^{n-1} e_1(\pi^i P, \pi^i \hat{\phi} H(m)) = \prod_{i=0}^{n-1} \pi^i e_1(P, \hat{\phi} H(m))$$
$$= \prod_{i=0}^{n-1} \pi^i e_2(\phi(P), H(m)) = \prod_{i=0}^{n-1} \pi^i e_2(Q, H(m)).$$

Also, the trace map may be used down to a base field to shorten points on an elliptic curve (or more generally on any Abelian variety). In other words, the output of a trace map on elliptic curves (or higher dimensional Abelian varieties) may be utilized as a method for shortening the representation of a point over an extension field by using data on the lower field.

Signing with Multiple Elliptic Curves

Another way to enhance the strength of short signature schemes is to use multiple public keys and add up the resulting signatures. This modification can be used by itself or combined with the Galois invariant enhancement discussed above.

Figure 4:
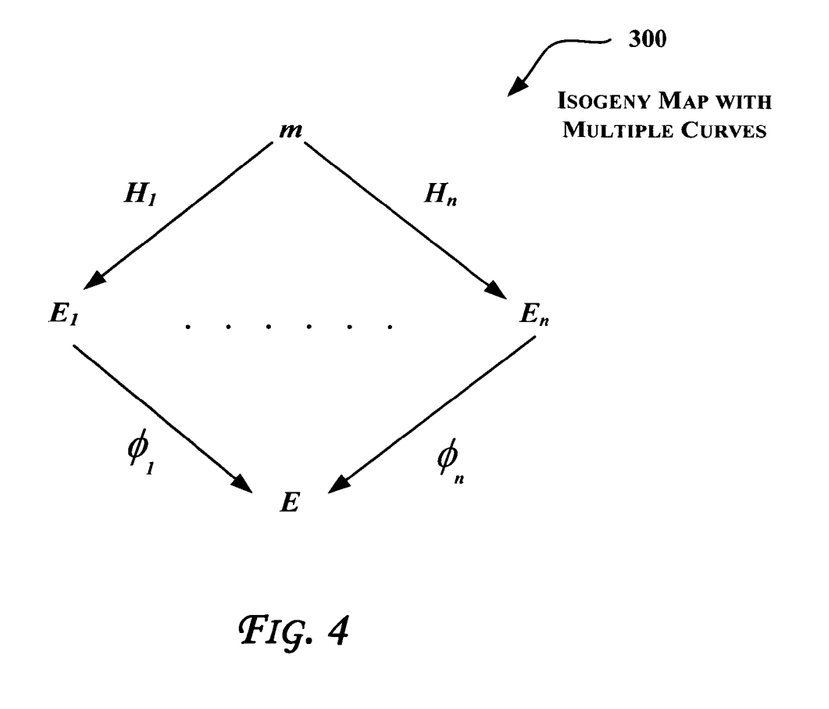
FIG. 4 illustrates an exemplary map of an isogeny between multiple curves.

With reference to FIG. 4, we assume there is a family of isogenies $\phi_i$: $E \rightarrow E_i$ and a family of random oracle hash functions $H_i$ each mapping a message m into a point on the elliptic curve $E_i$. Similar to the stages discussed with reference to FIG. 3:

Public key. Pick random $P \in E$ and publish $P, Q_1, Q_2, \ldots, Q_n$ (see, e.g., 302), where $Q_i = \phi_i(P)$.

Secret key. The family of isogenies $\phi_i$.

Signature. For each message m, the signature of m (S) is $$\sum_{i=1}^{n} \hat{\phi}_i(H_i(m))$$

(see, e.g., 304). The signed message is then sent to a receiving party (see, e.g., 306).

Verification. Given a (message, signature) pair (m, S), check whether $$e(P, S) = \prod_{i=1}^{n} e(Q_i, H_i(m))$$

(see, e.g., stage 310 discussed with reference to FIG. 3). For a valid signature this equation holds since:

$$e(P, S) = e\left(P, \sum_{i=1}^{n} \hat{\phi}_i(H_i(m))\right) = \prod_{i=1}^{n} e(P, \hat{\phi}_i(H_i(m))) = \prod_{i=1}^{n} e(Q_i, H_i(m)).$$

The system is believed to be at least as secure as using just a single isogeny, since anybody who can break the multiple isogenies version can convert the single isogeny version to the multiple isogenies version by adding in isogenies $\phi_2, \ldots, \phi_n$ as determined by them. Moreover, for such a system, any successful attack on the multiple isogenies version requires a simultaneous break of all of the single isogenies $\phi_1$ through $\phi_n$.

Identity Based Encryption (IBE) Scheme with Isogenies

Figure 5:
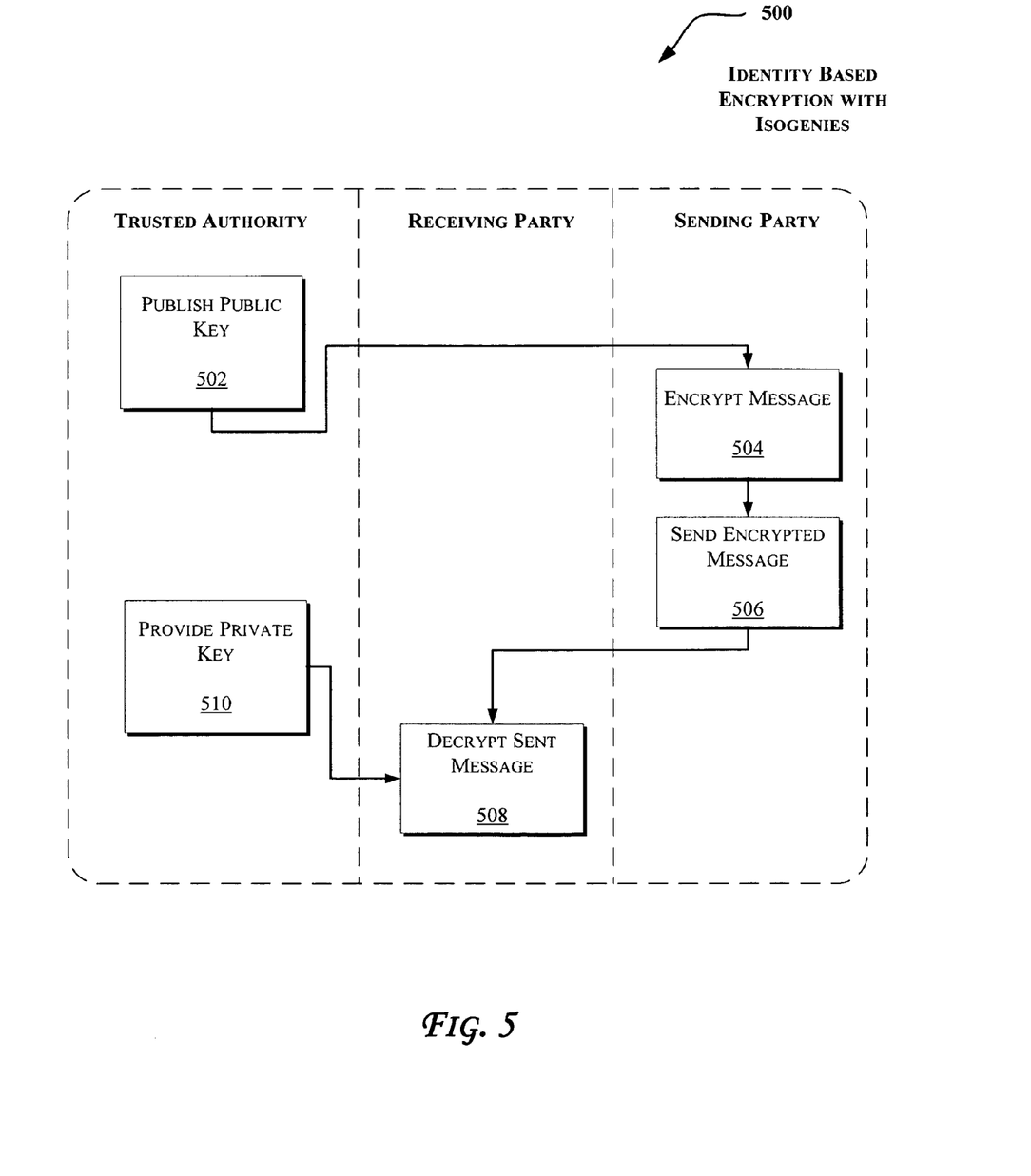
FIG. 5 illustrates an exemplary method for identity based encryption (IBE) using isogenies.

FIG. 5 illustrates an exemplary method 500 for identity based encryption (IBE) using isogenies. The one-way isogeny between the elliptic curves is believed to make an identity based encryption (IBE) scheme potentially secure against computational Diffie-Hellman (CDH). The IBE scheme may be defined as follows.

MAP TO POINT: Define the operation ID $\mapsto P \in E$ for some curve E. More specifically, one may compute H(id) and use it to define a point. It may be assumed that H behaves like a random oracle. Alternately, we may keep a table of points and hash ID into a random string of weights and then take a weighted sum. We may also assume that there is a trusted authority and a finite set of users, each with some ID from which one can compute the corresponding public key. Each user gets his private key after suitable identification by the trusted authority.

Public Key for the Trusted Authority: $\alpha \in E_1$, $\beta = \phi(\alpha)$. Accordingly, a trusted authority (or another entity such as a receiving party) provides and publishes public keys (502). If a twist $\lambda$ is being used, we may that $\alpha = \lambda(a)$ is the twisted image of some point a.

Private Key for the Trusted Authority. An efficiently computable $\hat{\phi}$.

For example, encrypted data from Bob to Alice can be implemented as follows:

Public Key for Alice: $T \in E_2$ is provided, e.g., via the map-to-point function ID $\mapsto T$ (502) by a trusted authority (or another entity such as a receiving party).

Private Key for Alice: $S=\hat{\phi}(T)$. Note that attacking to get a private key quickly for each client would take time similar to the one for global break in the signature system (discussed above). As a result, these systems may also be referred to as two-tier systems.

Encryption by Bob. Compute ALICE $\mapsto T$ (stage 504, which encrypts a message with the generated public key). Let the message be m. Pick a random integer r. Send to Alice the pair (506):

$$[m \oplus H(e(\beta, rT)), r\alpha]$$

Decryption by Alice. Let the cipher text be [c,T]. The encrypted message sent is decrypted (508) using a private key (510) provided by a trusted authority (or another entity such as a receiving party) after suitable identification. As a result, the clear text is:

$$c \oplus H(e(r\alpha, S))$$

This works because the quantity being hashed in the encryption stage is:

$$e(\beta, rT) = e(\phi(\alpha), rT) = e(\alpha, \hat{\phi}(rT)) = e(\alpha, r\hat{\phi}(T)) = e(\alpha, rS) = e(r\alpha, S),$$

which is equal to the quantity being hashed in the decryption stage. An isogeny may be represented as discussed below (e.g., to use a probabilistic approach involving a table of entries).

Specifying an Isogeny

If the isogeny is smooth, it may be represented as a composition of small degree isogenies given by a straight-line program representing polynomial computations. For curves over extensions of interest, a small table of input-output pairs suffices in an implementation.

Taking End(E)=End$_{\bar{k}}$(E), finite extensions of k may be considered and the extension may be specified as appropriate. In one implementation, an isogeny is specified by its action on the group of points over some finite extension of the ground field. Note that two isogenies may coincide up to some extensions, but may be distinct in a larger field. Accordingly, it suffices to specify $\phi$ on a set of generators S. Generally, the group is cyclic, or as above |S|=2. It is considered not easy to find the generators, but one can choose S randomly.

More particularly, as an Abelian group E(k) (recall: k is a finite field of q elements) is isomorphic to $Z/mZ \times Z/nZ$, where mn=#E(k), n|m and in addition n|D, D=(mn,q −1). One can compute mn=#E(k) using Schoof's algorithm and if the factorization of D is known, n can be obtained using a randomized polynomial time algorithm. If $P$ and $Q$ are of order n and m respectively such that any point can be written as $aP+bQ$, they are called generators in echelon form and an $$O\left(q^{\frac{1}{2}+\varepsilon}\right)$$

algorithm may be used for constructing them.

Turning to random choices (Erdos-Renyi), let G be a finite Abelian group and $g_1, \ldots, g_k$ be random elements of G. There exists a small constant c, such that its subset sums are almost uniformly distributed over G, if $k \geq c \cdot \log|G|$. In particular, the $g_i$ may generate G. To reduce the table size, one can use its strengthening weighted subset sums rather than subset sums when the group order is a prime. This extends to arbitrary orders with some small loss of parameters.

Moreover, the structure of E(k) may be used to obtain more detailed information. One can pick random points $P_i, i \leq 2$ and write them as $P_i = a_i P + b_i Q$. More particularly, one can express each of the echelon generators by linear combinations of $P_i$ if the matrix $$\begin{bmatrix} a_1 & a_2 \\ b_1 & b_2 \end{bmatrix}$$

is invertible mod m (note that n|m). When this happens, $\{P_i\}$ will generate the group. Note that the probability (both $P_1$ and $P_2$) falls in the group generated by $P$ is $m^{-2}$. Similarly, the probability for the group generated by $Q$ is $n^{-2}$. Thus, either of these two events do not happen with probability $(1-m^{-2})(1-n^{-2}) = 1+(\#E)^{-2}-(m^{-2}+n^{-2})$.

Hardware Implementation

Figure 6:
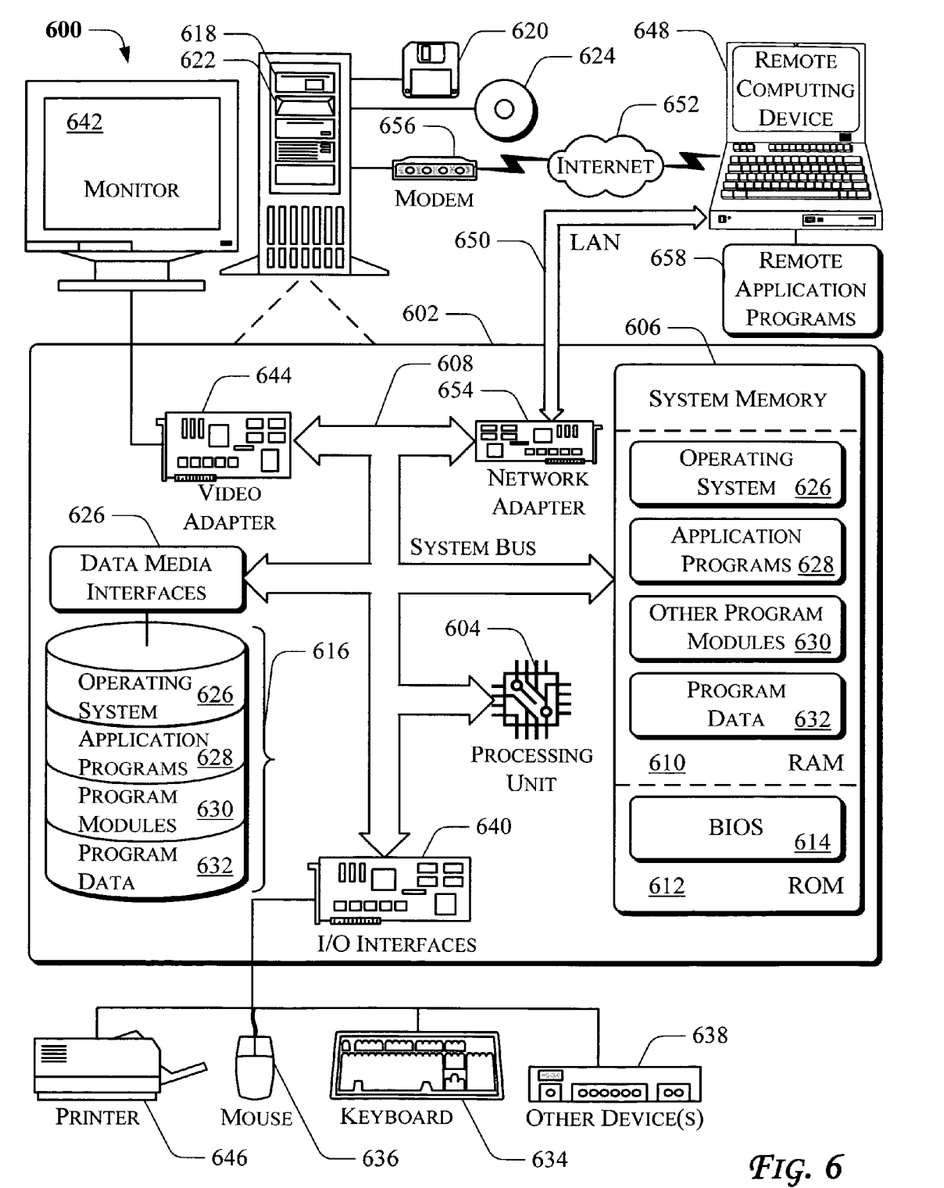
FIG. 6 illustrates a general computer environment 600, which can be used to implement the techniques described herein.

FIG. 6 illustrates a general computer environment 600, which can be used to implement the techniques described herein. For example, the computer environment 600 may be utilized to execute instructions associated with performing the tasks discussed with reference to the previous figures. Furthermore, each entity discussed herein (e.g., with respect to FIGS. 1, 3, and 5 such as the trusted party, receiving party, and/or sending party) may each have access to a general computer environment.

The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer-readable media. Such media can be any available media that is accessible by computer 602 and includes both volatile and non-volatile media, removable and non-removable media.

The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer-readable instructions, data structures, program modules, and other data for computer 602. Although the example illustrates a hard disk 616, a removable magnetic disk 620, and a removable optical disk 624, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise "computer storage media".

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

For example, the elliptic curves discussed herein are a one-dimensional case of Abelian varieties. Also, isogenies may be used in other applications such as blind signatures, hierarchical systems, and the like. As such, the techniques described herein may be applied to higher dimension Abelian varieties.

What is claimed is:

1. A method comprising:
   generating an isogeny that maps a plurality of points from a first elliptic curve onto a second elliptic curve, wherein the isogeny is generated using a technique selected from a group comprising complex multiplication generation, modular generation, linearly independent generation, and combinations thereof;
   publishing a public key corresponding to the isogeny;
   encrypting a message using a encryption key corresponding to the isogeny; and
   decrypting the encrypted message using a decryption key corresponding to the isogeny, wherein the decrypting is performed by bilinear pairing and wherein the bilinear pairing is a pairing selected from a group comprising Weil pairing, Tate pairing, and square pairing; and
   using a trace map to shorten points on an Abelian variety.

2. A method as recited by claim 1, wherein at least one of the encryption key or the decryption key is a private key, the private key being a dual isogeny of the isogeny.

3. A method as recited by claim 1, wherein the generating maps a plurality of points from a first elliptic curve onto a plurality of elliptic curves.

4. A method as recited by claim 1, wherein the method is applied using Abelian varieties.

5. A method as recited by claim 1, wherein the method signs the message.

6. A method as recited by claim 1, wherein the method provides identity based encryption.

7. A method as recited by claim 1, further comprising composing a plurality of modular isogenies to provide the isogeny without revealing any intermediate curves.

8. A method as recited by claim 1, further comprising using a trace map down to a base field to shorten points on an elliptic curve mapped by the isogeny.

9. A method comprising:
   publishing a public key corresponding to an isogeny that maps a plurality of points from a first elliptic curve onto a second elliptic curve, wherein the isogeny is generated using a technique selected from a group comprising complex multiplication generation, modular generation, linearly independent generation, and combinations thereof; and
   decrypting an encrypted message using a decryption key corresponding to the isogeny, wherein the decryption is performed by bilinear pairing and wherein the bilinear pairing is a pairing selected from a group comprising Weil pairing, Tate pairing, and square pairing.

10. A method as recited by claim 9, wherein the decryption key is a dual isogeny of the isogeny.

11. A method as recited by claim 9, wherein the isogeny maps a plurality of points from a first elliptic curve onto a plurality of elliptic curves.

12. A method as recited by claim 9, wherein the method is applied using Abelian varieties.

13. A method as recited by claim 9, wherein the method signs the message.

14. A method as recited by claim 9, wherein the method provides identity based encryption.

15. A method as recited by claim 9, further comprising using a trace map down to a base field to shorten points on an elliptic curve mapped by the isogeny.

16. A system comprising:
   a first processor;
   a first system memory coupled to the first processor, the first system memory storing a public key corresponding to an isogeny that maps a plurality of points from a first elliptic curve onto a second elliptic curve;
   a second processor;
   a second system memory coupled to the second processor, the second system memory storing an encrypted message and a decryption key corresponding to the isogeny to decrypt the encrypted message, wherein the decryption is performed by bilinear pairing and wherein the bilinear pairing is a pairing selected from a group comprising Weil pairing, Tate pairing, and square pairing,
   wherein the encrypted message is encrypted using an encryption key.

17. A system as recited by claim 16, wherein at least one of the encryption key or the decryption key is a private key, the private key being a dual isogeny of the isogeny.

18. A system as recited by claim 16, wherein the isogeny maps a plurality of points from a first elliptic curve onto a plurality of elliptic curves.

19. One or more computer-readable media having instructions stored thereon that, when executed, direct a machine to perform acts comprising:
   publishing a public key corresponding to an isogeny that maps a plurality of points from a first elliptic curve onto a second elliptic curve, wherein the isogeny is generated using a technique selected from a group comprising complex multiplication generation, modular generation, linearly independent generation, and combinations thereof; and
   decrypting an encrypted message using a decryption key corresponding to the isogeny, wherein the decrypting is performed by bilinear pairing and wherein the bilinear pairing is a pairing selected from a group comprising Weil pairing, Tate pairing, and square pairing.

20. One or more computer-readable media as recited by claim 19, wherein the decryption key is a private key, the private key being a dual isogeny of the isogeny.

21. One or more computer-readable media as recited by claim 19, wherein the isogeny maps a plurality of points from a first elliptic curve onto a plurality of elliptic curves.

22. One or more computer-readable media as recited by claim 19, wherein the acts are applied using Abelian varieties.

23. One or more computer-readable media as recited by claim 19, wherein the acts further comprise using a trace map down to a base field to shorten points on an elliptic curve mapped by the isogeny.

24. One or more computer-readable media as recited by claim 19, wherein the acts further comprise composing a plurality of modular isogenies to provide the isogeny without revealing any intermediate curves.

25. One or more computer-readable media as recited by claim 19, wherein the acts further comprise using a trace map to shorten points on an Abelian variety.

26. One or more computer-readable media as recited by claim 19, wherein the acts sign the message.

27. One or more computer-readable media as recited by claim 19, wherein the acts provide identity based encryption.

* * * * *

UNITED STATES PATENT AND TRADEMARK OFFICE
CERTIFICATE OF CORRECTION

| | | |
|---|---|---|
| PATENT NO. | : 7,499,544 B2 | Page 1 of 1 |
| APPLICATION NO. | : 10/816083 | |
| DATED | : March 3, 2009 | |
| INVENTOR(S) | : David Y. Jao et al. | |

It is certified that error appears in the above-identified patent and that said Letters Patent is hereby corrected as shown below:

In column 8, line 66, before "that" insert -- assume --.

Signed and Sealed this
Nineteenth Day of April, 2011

David J. Kappos
*Director of the United States Patent and Trademark Office*